June 5, 1928.

E. W. ENGLE 1,672,714

NONAQUEOUS ELECTROLYTIC CONDENSER

Filed Aug. 29, 1927

Inventor
Edgar W. Engle

Patented June 5, 1928.

1,672,714

UNITED STATES PATENT OFFICE.

EDGAR W. ENGLE, OF LAKE FOREST, ILLINOIS, ASSIGNOR TO FANSTEEL PRODUCTS COMPANY, INC., OF NORTH CHICAGO, ILLINOIS, A CORPORATION OF NEW YORK.

NONAQUEOUS ELECTROLYTIC CONDENSER.

Application filed August 29, 1927. Serial No. 216,122.

This invention relates to electrolytic condensers of the type using electrodes of filmed metal such as aluminum, tantalum, etc., in a suitable electrolyte solution.

Electrolytic condensers utilize as a dielectric the resistant film formed on an aluminum plate. This film is often broken down or dissolved by the electrolyte solution when the condenser stands idle and it is often broken down by excessive loads. It is also subject to leakage due to imperfections in forming or impurities in the aluminum.

The object of this invention is to overcome these difficulties.

A further object is to provide an electrolytic condenser in which the film is permanent, even over periods of idleness.

A further object is to provide an electrolyte solution which will not evaporate.

A further object is to provide an electrolyte solution which will not creep.

A further object is to provide an electrolyte solution which will permit gas to escape under over load conditions and which will be more self-healing than electrolyte solutions now used; that is, which will cause the film to re-form more readily after it has been broken down.

A further object is to provide an electrolyte condenser in which leakage current is reduced to a minimum, in which internal resistance is very low, and which is practically permanent.

Other objects will be apparent as the details of the description proceed.

Figure 1:
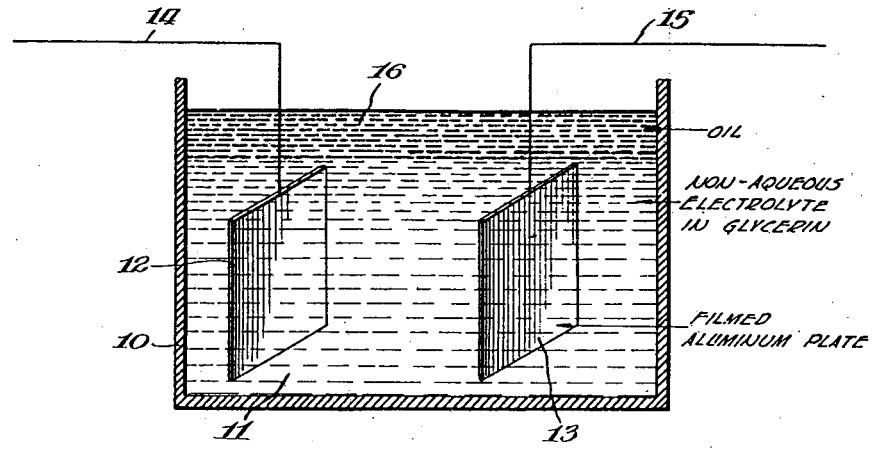
Figure 2:
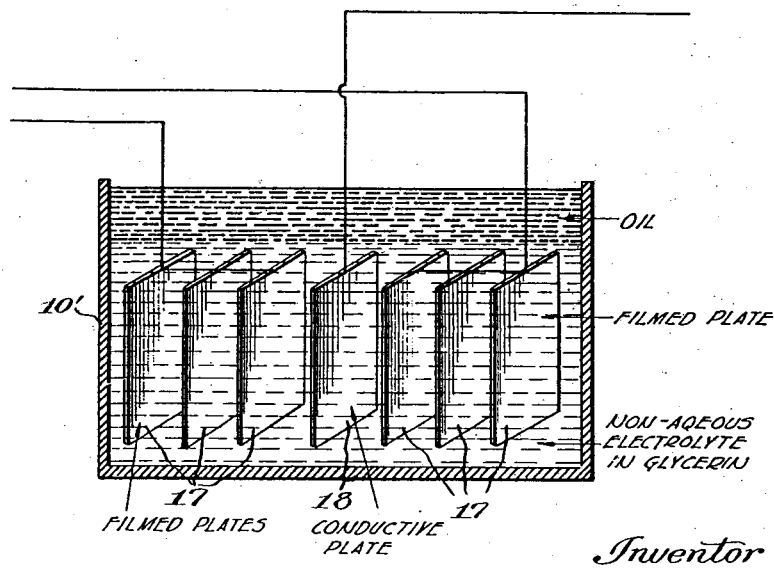

Preferred embodiments of my invention are disclosed in the accompanying drawings, in which Fig. 1 represents diagrammatically a simple condenser using two aluminum electrodes; and Fig. 2 represents a unidirectional condenser having an iron electrode and a plurality of aluminum electrodes.

A suitable receptacle 10 of glass or any other material not affected by a glycerin solution contains an electrolyte solution 11 which is prepared by dissolving one ounce of sodium bicarbonate in a liter of polyhydric alcohol such as ethylene glycol or a commercial glycerin (glycerol). While sodium bicarbonate has been found to give excellent results, it is understood that any acid, base or salt—that is, any ionogen—can be used in its place. Sodium bi-carbonate, however, is preferred because it has been found to yield a more uniform and a more permanent film. Likewise I desire it to be understood that although I prefer to employ a polyhydric alcohol such as glycerin, other polyhydric alcohols and monohydric alcohols such as butyl alcohol may be employed, and my invention includes all such equivalent elements.

Filmed electrodes 12 and 13 are immersed in the glycerin solution and are connected to an electrical circuit by conductors 14 and 15. A layer of oil 16 is preferably maintained above the surface of the glycerin solution in order to prevent the evaporation of glycerin or the absorption of water from the atmosphere.

The filmed plates are preferably prepared by thoroughly cleaning them in sodium carbonate and acid solutions to remove organic and inorganic impurities, subjecting them to an A. C. potential of about 325 volts in a dilute aqueous solution, subsequently subjecting them to a D. C. potential of about 280 volts in the same solution and finally subjecting them to a D. C. potential of about 250 volts in the substantially dry glycerin solution.

The forming process per se may be accomplished in any conventional manner.

Fig. 2 represents diagrammatically a type of electrolytic condenser which has been found very satisfactory for radio power units.

A suitable receptacle 10' contains a glycerin solution 11' into which are immersed a plurality of filmed plates or groups of plates 17. These form the positive terminal of the condenser, the films form the dielectric and the glycerin solution acts as the negative plate. It is desirable, however, to introduce an iron electrode 18 to serve as a conductor for descreasing the internal resistance of the cell and conducting the electricity to various parts of the electrolyte solution.

The use of glycerin instead of water for dissolving the electrolyte offers many marked and unexpected advantages. The film is maintained practically permanent, even during periods of idleness, and is easily reformed when broken down by overload currents. The electrolyte solution does not creep or evaporate and has been found to give excellent results in commercial applications.

The term "ionogen" as used in the claims is a generic expression which includes acids, bases, salts and/or other substances which ionize and conduct a current in certain solutions and/or in fluid conditions. An electrolyte is, therefore, an ionogen solution.

The expression "substantially dry," as used in the appended claims, does not mean that no trace of water is present but that the electrolyte is essentially a solution of the ionogen in gylcerin as distinguished from an aqueous solution to which glycerin has been added.

While I have described a particular embodiment of my invention, it is understood that I am not limited to the details shown except as defined by the following claims:

I claim:

1. In electrolytic apparatus, a filmed electrode and an ionogen dissolved in glycerin.

2. An electrolytic condenser including a filmed electrode immersed in a solution of an ionogen dissolved in substantially dry glycerin.

3. In combination, a container, a substantially dry solution of an ionogen in glycerin, a filmed aluminum electrode immersed in said solution, a second electrode in electrical contact with said solution, and a seal above said solution to prevent the absorption of water.

4. A condenser comprising a filmed aluminum electrode, an electrode of non-filming metal, an ionogen dissolved in glycerin, and an oil layer above said glycerin to prevent evaporation and water absorption.

5. A condenser comprising a plurality of filmed electrodes, a conductive electrode, and an ionogen dissolved in substantially dry glycerin, whereby the filmed electrode acts as one plate, the film as a dialectric and the glycerin solution as the other plate, the conductive electrode merely serving to distribute the current through the glycerin.

6. In electrolytic apparatus, a filmed electrode and an ionogen dissolved in a substantially dry alcohol.

7. In electrolytic apparatus, a filmed electrode and an ionogen dissolved in a substantially dry polyhydric alcohol.

In witness whereof, I hereunto subscribe my name this 23rd day of August, 1927.

EDGAR W. ENGLE.